United States Patent [19]
Raby

[11] 3,925,695
[45] Dec. 9, 1975

[54] ROTOR RESISTOR AND FAN FOR AC INDUCTION MOTOR

[75] Inventor: Virgil W. Raby, Dayton, Ohio

[73] Assignee: General Motors Corporation, Detroit, Mich.

[22] Filed: June 25, 1974

[21] Appl. No.: 482,888

[52] U.S. Cl. ............................................. 310/72
[51] Int. Cl.² ...................................... H02K 11/00
[58] Field of Search ....... 310/68, 42, 68 D, 72, 166, 310/62, 63, 212, 64, 198, 261; 318/514

[56] References Cited
UNITED STATES PATENTS

| | | | |
|---|---|---|---|
| 1,256,705 | 2/1918 | Lebovici | 310/166 |
| 1,740,599 | 12/1929 | Johnson | 310/212 |
| 2,634,379 | 4/1953 | Brainard | 310/67 |
| 2,748,333 | 5/1956 | Lee | 310/212 |
| 2,910,600 | 10/1959 | Young | 310/72 |
| 3,040,199 | 6/1962 | Karr | 310/72 |
| 3,575,622 | 4/1971 | Nielson | 310/72 |

Primary Examiner—R. Skudy
Attorney, Agent, or Firm—Charles R. Engle

[57] ABSTRACT

A rotating resistor-fan combination for a wound rotor AC induction motor includes a plurality of electrically conductive resistor-fan discs mounted for rotation on a motor shaft. The resistor-fan discs are stamped from electrically conductive sheet material in the form of a wheel including a hub and a rim connected by a plurality of spoke-like members. The rim is then secured in a fixture while the hub is attached to a spindle and rotated through a predetermined angle causing the hub to raise out of the plane of the stamped disc while simultaneously deforming the spokes into fan blades. The resistor-fan discs are paired in circuit with each phase of the three-phase wound rotor and in this manner provide a predetermined resistance in phase winding. The respective pairs of the resistor-fan discs can, of course, be formed to provide various surface areas so that a predetermined resistance is placed in the current path of the wye-connected three-phase rotor windings so as to provide predetermined output torque and speed characteristics.

4 Claims, 6 Drawing Figures

ROTOR RESISTOR AND FAN FOR AC INDUCTION MOTOR

This invention relates to alternating current electric motors and more particularly to an improved rotor resistor and cooling fan assembly for wound rotor induction motors.

In the field of the present invention, it is well known that an increase of resistance in the rotor circuit of an A.C. induction motor varies the motor output torque and speed characteristics. The higher rotor resistance increases the motor slip characteristic which determines the torque developed by an induction motor at a given motor speed. Increasing the slip characteristic accordingly increases the output torque of the motor at starting or low rotor speeds. In certain large horsepower, fan-cooled motors having high slip characteristics, resistor elements for increasing the rotor resistance are mounted directly on the rotor shaft. The resistors are usually carried by a shaft mounted hub member enclosed by a cover extending from the one end of the motor housing. One such arrangement is disclosed and claimed in U.S. Pat. No. 2,910,600 for a Rotor With Heat Radiating Means issued Oct. 27, 1959 and assigned to the assignee of this invention.

The mounting of the rotor resistance and the cooling fan on an extension of the motor shaft necessarily requires an increase in the overall length of the motor assembly. It is advantageous, however, to mount the rotor resistors directly on the rotor shaft so as to eliminate the use of slip rings to connect the resistors to the rotor circuit. Also, rotating the resistors with the rotor shaft conveniently aids resistor cooling.

Since it is desirable that the assemblies of electrical motors do not duly increase the size or weight of the motor while the rotor resistors must be rugged and capable of being securely mounted along with incorporating expanded cooling surfaces to aid dissipation of high resistor temperatures, it is particularly advantageous to provide a combination resistor and fan. Materials used for many prior rotor resistors include Nichrome or a nickel-iron based metal in a wire or thin ribbon form. These metals are not entirely satisfactory in many instances since they are expensive, are difficult to machine and work, and limit the mounting arrangements which can be used. Another significant consideration in the area of my invention is the level of noise developed in many prior rotor resistor assemblies. Noise often becomes excessive and objectionable at high rotor speeds. This, of course, is particularly undesirable when the motor assembly is included in a drive system used in environments having personnel working nearby. This objectionable noise is usually developed at high shaft speeds by wind resistance of the resistors causing air turbulence and vibrations.

In the present invention, a rotor resistor and cooling fan assembly is mounted on a support member drivingly connected to a shaft extension of a wound rotor induction motor. A plurality of resistor-fan discs are secured to the support member for rotation therewith and are electrically insulated from one another by a plurality of interspaced ceramic plates also mounted upon the support member. The resistor-fan discs are stamped from conductive sheet metal having predetermined resistance characteristics so that the current path through a particular wye-connected three phase rotor winding will be subjected to a particular resistance resulting in a specific motor speed when the discs are connected in circuit with the rotor winding. More specifically, the resistor-fan discs are stamped from the sheet metal stock in the form of a wheel including a hub portion and a peripheral rim being connected via integral spoke fan blades. The width of the fan blades would, of course, determine the resistance of the current path when connected in circuit with the wye-connected three phase rotor windings. After stamping, the rim of the disc is securely retained while a fixture is attached to the hub portion of the disc and the hub is rotated through a predetermined arc causing the hub to raise out of the plane in which the disc was originally residing. The movement of the hub out of this plane results in a predetermined deformation of the spoke fan blade members interconnecting the rim and the hub and in this manner air propelling fan blades are provided on the disc.

Of course, it is obvious that any number of the resistor-fan discs can be nested together upon the shaft extension so as to provide a predetermined rotor winding resistance and consequent specific motor operational characteristics. The nesting of a plurality of the resistor-fan discs upon the shaft extension substantially reduces the axial length of the overall motor assembly. By utilizing a cooling fan which also acts as a resistor for the wound rotor, it is obvious that the axial length of the motor assembly is held to a minimum.

Accordingly, a general object of this invention is the provision of an improved rotor resistor and fan assembly for induction motors wherein the fan elements are composed of electrically conductive material and are connected in circuit with the wound rotor providing desired resistance characteristics while rotation of the fan cools the electrically heated resistance material while also simultaneously blowing cooling air across the motor assembly.

Another object of the present invention is the provision of a rotor resistor and cooling fan assembly which is easily mounted upon an extension of the motor shaft and is retained thereon by electrically conductive fastening means providing a ground connection for the rotor winding circuit.

A further object of the present invention is the provision of a support member drivingly connected to an extension of the motor shaft and including an annular flange receiving electrically conductive means fastening alternately disposed resistor-fan discs and ceramic insulator plates so that the resistor-fan discs are rigidly secured to the support member for rotation with the shaft while being electrically insulated from one another.

A still further object of the present invention is the provision of a rotor resistor and cooling fan assembly for a wound rotor induction motor wherein a plurality of discs are secured to an extension of the motor shaft and insulated therefrom by alternately positioned ceramic plates between hub portions of resistor-fan discs, the resistor-fan discs being paired such that a first one is connected in circuit with one of wye-connected three phase rotor windings and is connected at its peripheral rim to an adjoining disc so that the current flow is outwardly through the first one of the paired resistor discs and is radially inwardly back through a second of the paired resistor-fan discs and the circuit is to ground through means fastening the paired resistor-fan discs and the insulating discs to a support member retaining the assembly upon the shaft extension.

The novel features which I believe to be characteristic of my invention are set forth with particularity in the appended claims. My invention itself, however, both as to its organization and method of operation, may best be understood by reference to the following description taken in connection with the accompanying drawings in which:

Figure 1:
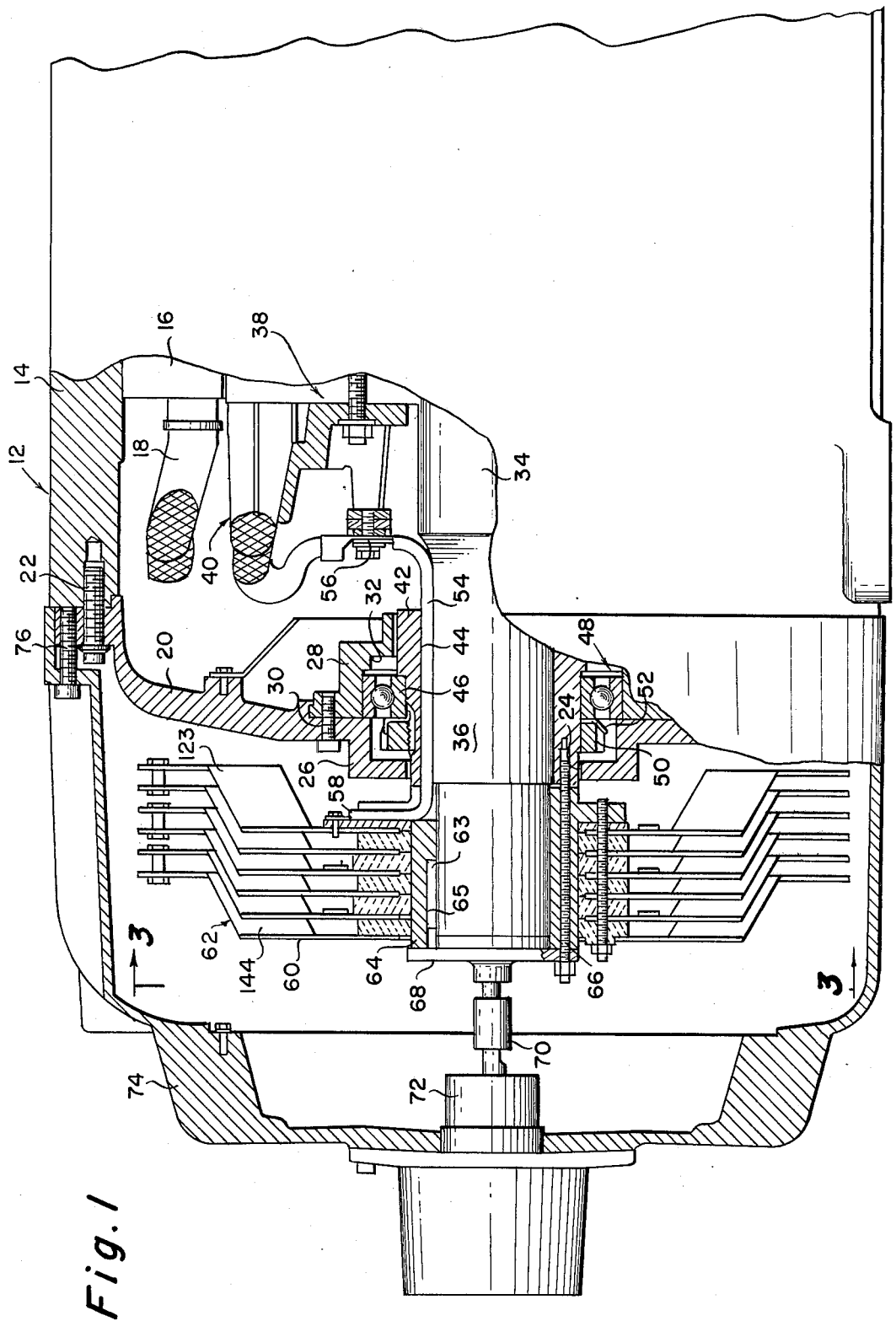
FIG. 1 is a side elevational view, partly in section, of a wound rotor induction motor illustrating the resistor-fan assembly of the subject invention.

Referring now to FIG. 1, an A.C. wound rotor induction motor assembly 12 includes a frame member 14 supporting on its inner peripheral surface a stator assembly 16 including a laminated core having slots receiving a stator winding 18. An end frame member 20 is attached to the motor frame member 14 via a plurality of machine screws 22 and defines an aperture 24. The end frame member 20 is formed to include an axially extending cylindrical boss 26 defining the aforementioned aperture 24. A bearing housing member 28 is attached to the end frame member 20 by a plurality of machine screws 30 and cooperates with the boss 26 defining a bearing supporting cavity 32.

The A.C. induction motor assembly 12 includes a shaft 34 having an extension 36 rotatably supported in aperture 24 of the end frame member 20. The shaft 34 has a rotor assembly 38 mounted thereon for rotation therewith, the rotor assembly including a laminated core having a wye-connected three phase rotor winding assembly 40 placed thereon. The shaft extension 36 has a bearing support sleeve 42 mounted for rotation with the shaft and containing three axially extending slots 44, only one of which is shown, permitting passage of a conductor through the bearing support sleeve for a purpose later to be described. The bearing sleeve 42 supports inner race 46 of a bearing assembly 48 so that the sleeve and the shaft rotate relative to the end frame member 20 and the bearing housing member 28. A lock nut 50 is threadably positioned upon the bearing sleeve 42 and is locked in place by a cylindrical locking key 52 retaining the bearing assembly 48 in position during operation of the A.C. induction motor.

Figure 2:
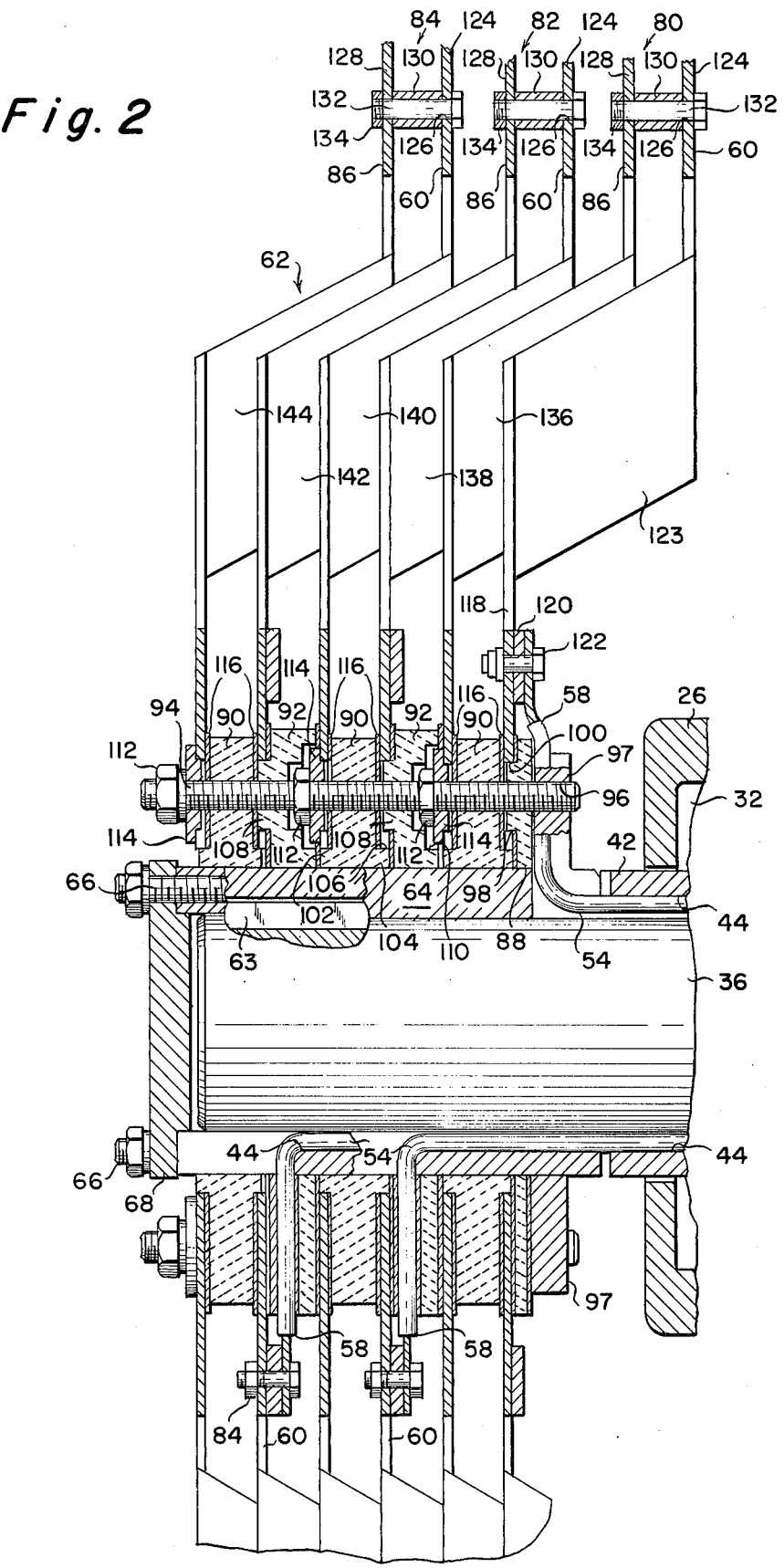
FIG. 2 is an enlarged fragmentary side elevational view, partly in section, illustrating the specific structure of the subject invention.

Three conductor members 54 are placed within the axially extending slots 44 through the bearing support sleeve 42 and each have one end connecting with a particular phase winding of the wye-connected three phase rotor winding 40, one of such connections being shown at 56 in FIG. 1. The other ends 58 of the conductor members 54 are secured to a first one of paired resistor-fan discs 60 mounted for rotation with the shaft extension 36 and which are a component of the resistor cooling fan assembly 62 of the subject invention, as best illustrated in FIG. 2. The resistor and cooling fan assembly 62 includes a cylindrical support member 64 mounted for rotation with the shaft extension 36 via a key 63 mounted in slot 65. The support member 64 is secured to the bearing sleeve 42 by a plurality of relatively long machine bolts 66 providing the aforementioned driving connection to the sleeve 42. Of course, the bearing support sleeve 42 is drivingly connected to the shaft extension 36 through either conventional locking keys or by other known fastening means. The machine bolts 66 also secure a drive cap 68 to the cylindrical support member 64. The cap 68 provides a driving connection through a coupling member 70 to an anti-plugging switch 72. The anti-plugging switch 72 is mounted in a cover member 74 secured to motor frame member 14 via a plurality of machine screws 76. The anti-plugging switch is used in a conventional manner to rapidly brake motor rotation and is not a part of the subject invention.

With reference now to FIG. 2, the structural components of the present rotor resistor and cooling fan assembly are shown in detail. Three pairs 80, 82 and 84 of resistor-fan discs, including the aforementioned first one of the discs 60 which in conjunction with a second disc 86 cooperates to form the respective pairs, are positioned upon support member 64. The resistor-fan discs 60 and 86 are insulated from each other and the support 64 by a plurality of ceramic insulator plates having three variations to form including plates 88, 90 and 92. The varying plate configurations are required to accommodate a mounting stud 94 of conductive material which threadably engages an aperture 96 in flange 97 of the support member 64. The ceramic plate 88 includes three equi-angularly circumferentially spaced bosses 98 engaging like spaced apertures 100 in the disc 60 for supporting the disc upon ceramic plate 88. The ceramic plates 90 include oppositely extending flanges 102 and 104 which support an inner portion 106 of the resistor-fan discs 60 and 86 when they are assembled upon the cylindrical support 64. The ceramic plates 92 include three equi-angularly circumferentially spaced axially extending bosses 108 which engage apertures 100 of the discs 60 and 86 for supporting them upon the insulator plates 92. A stepped recess 110 is also provided in the ceramic insulator plates 92 to accommodate nuts 112 which are threaded upon stud 94 for retaining the first and second pairs 80 and 82 of resistor-fan discs upon the support member 64. A similar nut 112 is utilized to fasten the third set 84 upon the support member as indicated. The nuts 112 engage copper washers 114 when tightened against the resistor-fan discs so as to provide a better electrical path between the conductive stud and the respective discs. In order to prevent fracture of the ceramic plates 88, 90 and 92 upon tightening of the nuts 112 on the electrically conductive stud 94, cushioning pads 116 are placed on both sides so that tightening of the nuts 112 against the copper washers 114 results in deformation of the cushioning pads as the components are assembled together without fracturing the relatively brittle insulating material. The cushioning pads can be composed of asbestos, mica or other heat resistant material.

Figure 4:
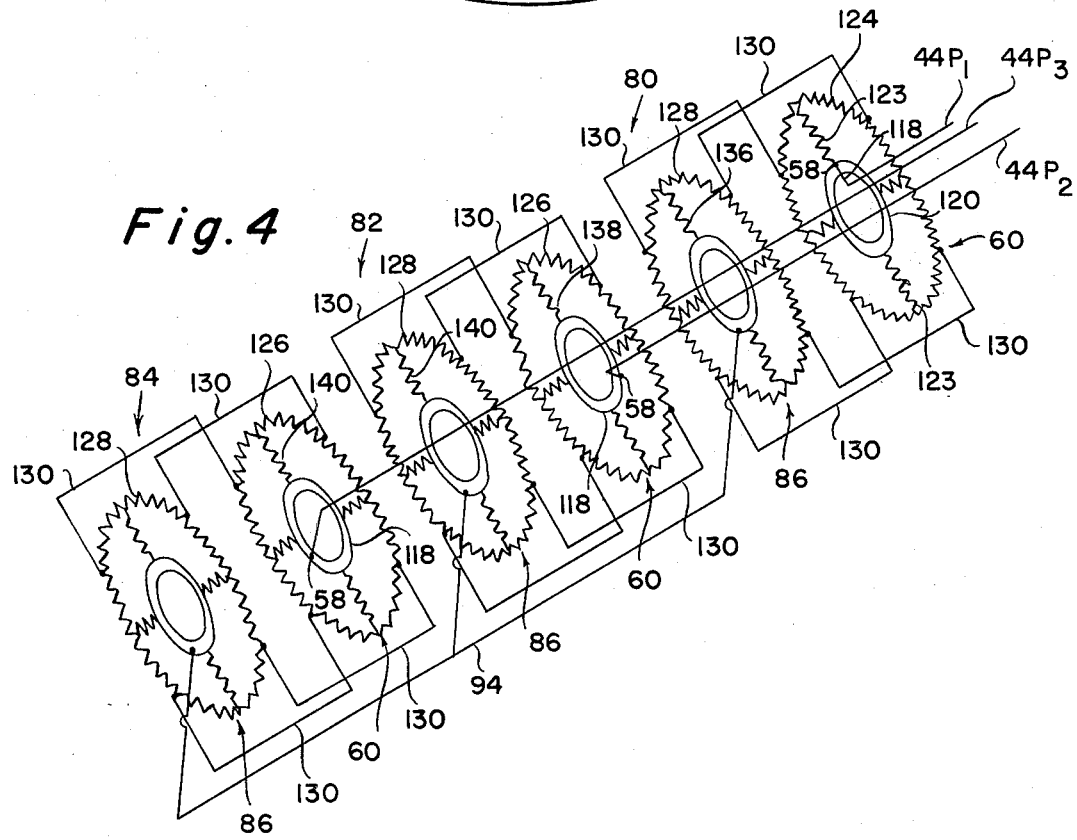
FIG. 4 is a schematic circuit diagram illustrating the connection of the resistor-fan discs in circuit with the wye-connected three phase windings of a wound rotor.

With regard to placing the pairs 80, 82 and 84 of the electrically conductive resistor-fan discs 60 and 86 in circuit with respective windings of the three phase rotor assembly, the conductors 44 are connected to respective windings in the rotor, such as $P_1$, $P_2$ and $P_3$ in FIG. 4, and extend through bearing sleeve 42 and support member 64 for connection with hub portion 118 of the respective first one of the discs 60. Conductor ends 58 are fastened tightly against conductive copper rings 120 circumferentially engaging hub portions 118 by machine screws 122. The tight securing of the copper rings 120 against hub portion 118 of the first resistor-fan disc 60 provides an even distribution of the current flow from the conductor 44 into the resistor-fan disc. The current then flows from the hub portion 118 radially outwardly through a plurality of spoke-like fan blades 123, in a preferred embodiment, the disc having four blades, to an integral circumferential rim 124. The first discs 60 each include four equally circumferentially spaced apertures 126 in the rims 124 which align with like apertures in the rims 128 of the second discs 86. An electrically conductive sleeve member 130 is positioned between the discs and retained in tight engagement by a bolt 132 secured in place by a nut 134. The current flow radially outwardly through the fan blades 123 is distributed evenly through rim 124 and is permitted to flow across to the second of the paired discs 86 through the four equally spaced conductive sleeves 130. The current then returns radially inwardly through fan blades 136 of the discs 86 into hub portions 118, through copper washers 114 and conductive stud 94 to ground thereby completing an electrical circuit from the respective three phase windings through a predetermined resistance in the resistor-fan discs 60 and 86 to ground. The current path with regard to pairs 82 and 84 of the resistor-fan discs 60 and 86 is as described with respect to the first pair 80 of such discs. In this manner, a predetermined resistance in accordance with the disc dimensions is provided in the respective wye-connected three phase windings of the rotor so as to provide predetermined motor characteristics suitable for a particular application.

Figure 3:
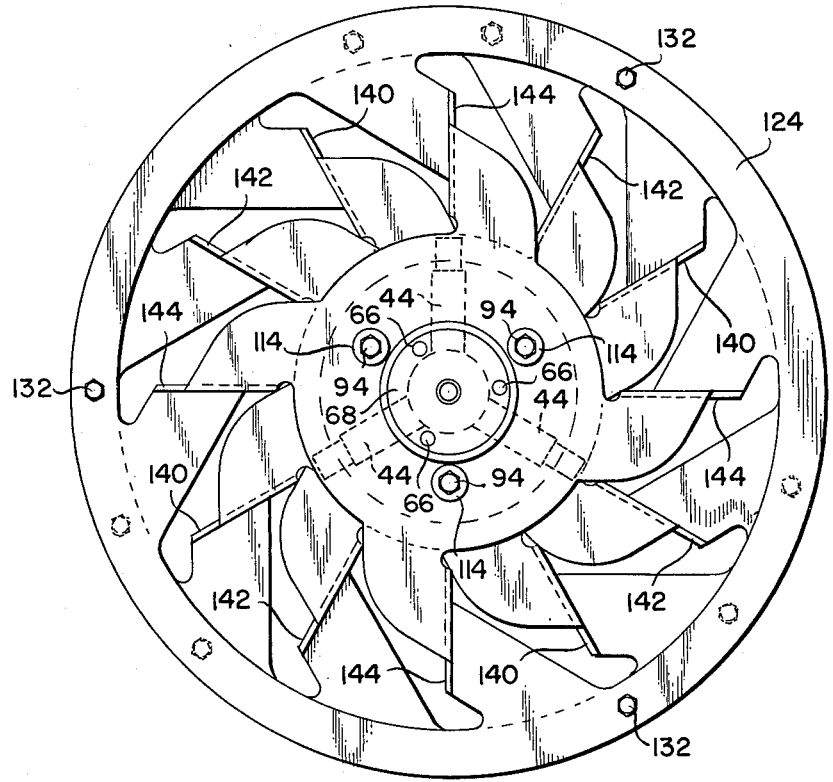
FIG. 3 is an end plan view looking in the direction of arrows 3—3 in FIG. 1.

Referring now to FIG. 3, the resistor-fan discs 60 and 86 are shown in a nested relationship with the respective blades rotated 30 degrees relative to the adjoining discs. More specifically, disc 86 of pair 84 is rotated 30 degrees relative to first disc 60 so that its fan blades 144 are positioned 30 degrees away from blades 142. Fan blades 140 of the first of the paired discs in set 82 are likewise rotated 30 degrees from blades 138 of the paired set 82. In the particular embodiment shown in FIG. 3, for purposes of illustration only, blades 138, 136 and 123, shown in FIG. 2, are rotated to a position directly behind blades 144, 142 and 140, respectively. With this configuration, the fan assembly presents twelve blades evenly spaced around the circumference of the motor assembly so as to be operable to draw air inwardly through cover member 74 and pump it across and cool the components of the motor assembly during operation thereof. Of course, the air pumped by the fan blades 144, 142, 140 138, 136 and 123 is effective to cool the fan blades themselves which are simultaneously acting as a resistance in circuit with the wye-connected three phase rotor windings. It is obvious that the resistor-fan discs 60 and 86 can be nested in paired relationships such that the degree of rotation is at a predetermined optimum causing the fan to supply a maximum amount of cooling air.

With reference now to FIG. 4, the circuitry of the subject invention is shown in schematic form. The conductors 44 are connected with the wye-connected three phase windings $P_1$, $P_2$ and $P_3$ of the rotor windings 40 and are connected respectively to the paired sets 80, 82 and 84 of the resistor-fan discs 60 and 86. For purposes of illustration, the first phase $P_1$ of the three phase rotor windings is connected to paired set 80 while the second phase is connected to disc set 82 and the third phase is connected to paired set 84. Each conductor 44 is connected to a respective hub portion 118 through respective copper rings 120 of the first disc 60 of each paired set 80, 82 and 84.

The current path from phase $P_1$ of the rotor windings is through conductor 44, circumferentially around copper ring 120 and through fan blades 123 of resistor-fan disc 60, circumferentially through rim 124 across the four sleeve conductors 130 into rim 128 of resistor-fan disc 86 radially inwardly through fan blades 136 to hub portion 120 and onwardly through copper washers 114 into conductive fastening stud 94 to ground, thereby completing the circuit from the first phase of the wye-connected three phase wound rotor. Phase windings $P_2$ and $P_3$ are similarly connected in circuit as shown in FIG. 4. It is obvious from the above description that the type of material, width and thickness of the fan blades can be predetermined to place a specific resistance in the current path for a particular motor application. In this manner, the motor speed is regulated in a predetermined manner by the resistance of the particular resistor-fan discs placed in series circuit with each phase winding of the wound rotor windings.

Figure 5:
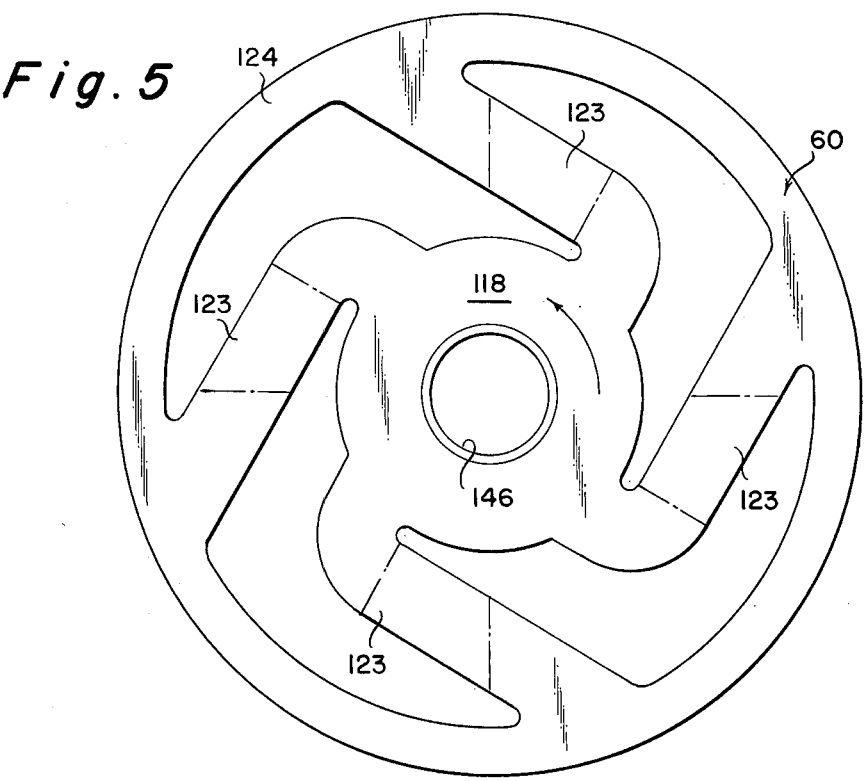
FIG. 5 is a plan view of a resistor-fan disc in its form as initially stamped from sheet stock material.
Figure 6:
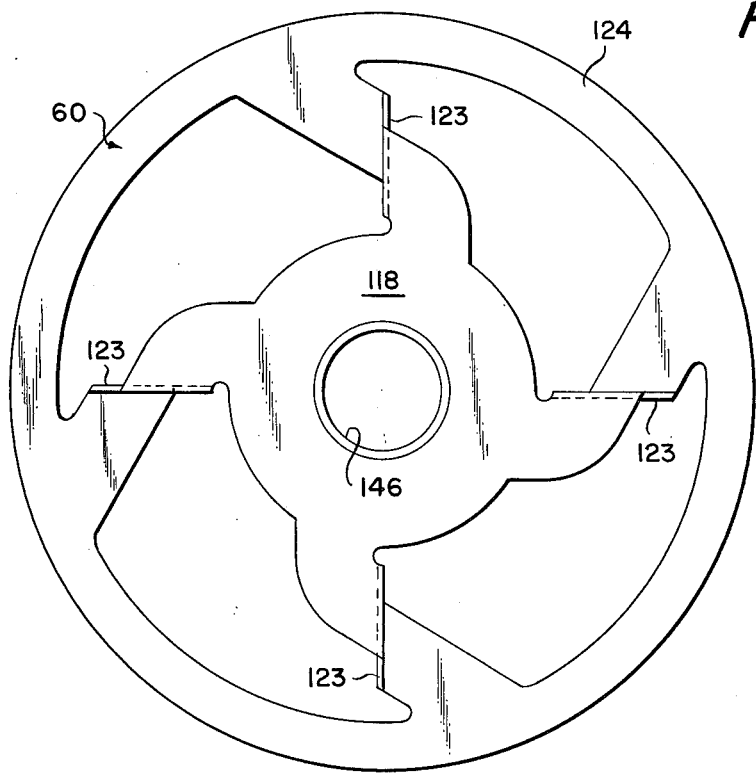
FIG. 6 is a plan view illustrating a resistor-fan disc of the subject invention after it has been deformed to include four fan blades.

Referring now to FIG. 5, as previously indicated, the resistor-fan discs, of which a disc 60 is representative, can preferably be formed by stamping the initial configuration from flat sheet stock material. In initial form the blades 123 lie in a plane with rim 124 and hub 118. As indicated in FIG. 6, in order to provide an air pumping surface on the fan blades 123 the originally stamped disc 60 is placed in a fixture wherein the rim 124 is secured in a fixed position and a spindle is attached to the hub 118 in aperture 146. The spindle is then rotated through a predetermined angle sufficient to cause the hub 118 to raise upwardly out of the surface of the plane normally containing the rim 124 and the blades 123 whereby the blades are deformed to the position shown in FIG. 6. The mid portions of each of the blades 123 constitute a fan blade capable of pumping air through the assembled rotor resistor and cooling fan assembly as illustrated in FIG. 2.

By forming the resistance members of a rotor resistor assembly into the form of a cooling fan, the present invention is significant because such an assembly does not require an increase in axial length of an A.C. induction motor. Further, the provision of resistances in a rotor winding circuit acting as cooling fan blades most efficiently positions the material being electrically heated for cooling during motor operation. Obviously, various types of materials can be used and various thicknesses and widths of fan blades can be incorporated to provide desired resistances. Also, the fact that the resistor-fan discs can be manufactured by first stamping a single component from sheet stock material and then by merely performing one forming operation, the discs are conveniently manufactured. These discs likewise lend themselves to a variety of applications resulting from the capability of nesting them together as illustrated in a preferred embodiment of my invention.

While I have shown and described a particular embodiment of my invention, it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. A rotor resistor and cooling fan assembly for an electric motor including a stator, a rotor including a shaft, and a winding carried by said shaft and rotatable relative to said stator, said rotor resistor and cooling fan assembly comprising: a cylindrical support member mounted on and drivingly connected with said shaft, a plurality of insulator plates positioned on said cylindrical support member, a plurality of resistor-fan electrically conductive discs each positioned between said insulator plates, means fastening said insulator plates and said resistor-fan discs in an assembled relationship upon said support member with said resistor-fan discs each being electrically insulated from one another, a plurality of fan blades integrally formed on each resistor-fan disc, electrically conductive means fastened between respective pairs of said resistor-fan discs adjacent their outer peripheries providing a current path therebetween, first electric conductor means connecting a radial inward surface of one of said paired resistor-fan discs in circuit with said rotor winding, and second electric conductor means connecting a radial inward surface of the other of said paired resistor-fan discs in circuit with a ground connection providing a complete circuit from said rotor winding whereby a current path is provided from said rotor winding radially outwardly through one of said resistor-fan discs and back radially inwardly through the other of said resistor-fan discs whereby said discs act as a resistor placing a predetermined resistance in accordance with the surface area of said discs in the current path with said rotor winding while said resistor-fan discs simultaneously pump cooling air across the motor assembly.

2. A rotor resistor and cooling fan assembly for a wound rotor induction motor including a stator, a rotor including a shaft, and a plurality of windings carried by said shaft and rotatable relative to said stator, said rotor resistor and cooling fan assembly comprising: a cylindrical support member mounted on said shaft, means drivingly connecting said support member to said shaft, a plurality of ceramic insulator plates positioned upon said cylindrical support member, a plurality of electrically conductive resistor-fan discs each positioned between said insulator plates, a plurality of resilient cushioning pads positioned between said ceramic insulator plates and said resistor-fan discs, electrically conductive means fastening said insulator discs and said resistor-fan discs in an assembled relationship upon said support member, said cushioning pads permitting tightening of said ceramic discs against said resistor-fan discs by said fastening means retaining said ceramic discs assembled upon said support member without fracture thereof, a plurality of fan blades integrally formed on each resistor-fan disc, a plurality of electrically conductive means fastened between respective pairs of said resistor-fan discs adjacent their outer peripheries providing a current path therebetween, a copper ring positioned adjacent a radial inward surface of a first one of said paired resistor-fan discs in contact therewith, first electric conductor means connecting the radial inward surface of said first one of said paired resistor-fan discs in circuit with one of said rotor windings, and second electric conductor means connecting a radial inward surface of the other of said paired resistor-fan discs in circuit with a ground connection, whereby a current path is provided from said rotor winding radially outwardly through said first one of said resistor-fan discs and back radially inwardly through the other of said resistor-fan discs thereby placing a predetermined resistance as determined by the surfaces of said paired discs in the current path with said rotor winding thereby regulating motor speed while said resistor-fan discs simultaneously pump cooling air across the motor assembly.

3. A rotor resistor and cooling fan assembly for a wound rotor induction motor including a stator, a rotor including a shaft, wye-connected three phase windings carried by said shaft and rotatable relative to said stator, said rotor resistor and cooling fan assembly comprising: a cylindrical support member mounted on said shaft and including a circumferential flange adjacent its inner end, means drivingly connecting said support member to said shaft, a plurality of ceramic insulator plates positioned upon said cylindrical support member, a plurality of electrically conductive integral resistor-fan discs each positioned between said insulator plates, a plurality of resilient cushioning pads positioned between said insulator plates and said resistor-fan discs, electrically conductive means secured to said support member flange fastening said insulator plates and said resistor-fan discs in an assembled relationship, said cushioning pads permitting tightening of said fastening means securely retaining said ceramic plates and said resistor-fan discs in assembled relationship without fracture of said ceramic plates, a plurality of fan blades integrally formed on each resistor-fan disc, said fan blades being formed said integral resistor-fan disc, each of said resistor-fan discs having a peripheral rim portion, a plurality of electrically conductive means fastening respective pairs of said resistor-fan discs adjacent their adjoining rim portions providing a current path therebetween, a copper ring positioned adjacent a radial inward surface of a first one of said paired resistor-fan discs in electrical contact therewith, first electric conductor means connecting said radial inward surface of said first one of said paired resistor-fan discs in circuit with respective ones of said wye-connected three phase windings on said rotor, and second electric conductor means connecting a radial inward surface of the other of said paired resistor-fan discs in circuit with a ground connection whereby a current path is provided from each one of said wye-connected rotor windings radially outwardly through a first one of said resistor-fan discs and back radially inwardly through the other of said resistor-fan discs thereby placing a predetermined resistance as determined by the surface of each of said paired discs in the current path with each of said wye-connected three phase rotor windings thereby regulating motor speed while said fan blades of said resistor-fan discs simultaneously pump cooling air across the motor assembly.

4. A rotor resistor and cooling fan assembly for a wound rotor induction motor including a stator, a rotor including a shaft, wye-connected three phase windings carried by said shaft and rotatable relative to said stator, said rotor resistor and cooling fan assembly comprising: a cylindrical support member mounted on said shaft and including a circumferential flange adjacent its inner end, means drivingly connecting said support member to said shaft, a plurality of ceramic insulator plates positioned on said cylindrical support member, a plurality of electrically conductive integral resistor-fan discs each positioned between said insulator plates, said electrically conductive resistor-fan discs being in the form of a wheel comprising a hub portion and a rim portion interconnected by a plurality of integral spoke-like fan blade members, said hub portions received upon said shaft alternately between said ceramic plates so that each of said resistor-fan discs is electrically insulated from one another upon said support member, a plurality of resilient cushioning pads positioned between adjoining surfaces of said ceramic insulator plates and said resistor-fan discs, electrically conductive fastening means extending axially through said ceramic insulator plates and said resistor-fan discs parallel to the axis of said shaft and threadably engaging said support member flange fastening them upon said support member for rotation therewith, said cushioning pads permitting tightening of said fastening means without fracture of said ceramic insulator plates, four equally circumferentially spaced electrically conductive sleeves fastened between respective pairs of said resistor-fan discs adjacent their peripheral rims providing a current path therebetween, a copper ring positioned adjacent the hub portion of a first one of said paired resistor-fan discs in electrical contact therewith, and electric conductor means connecting said first disc hub portion in circuit with a respective winding of said wye-connected three phase rotor windings, said electrically conductive disc and plate fastening means being a circuit ground connection through said support flange whereby the respective paired resistor-fan discs are connected in a complete circuit to ground by virtue of a current path from said rotor radially outwardly through the first one of said resistor-fan discs and back radially inwardly through the other of said paired resistor-fan discs to ground through said fastening means thereby placing a predetermined resistance determined by the surface of said discs in circuit with said rotor winding while said fan blades simultaneously pump cooling air across the motor assembly.

* * * * *

UNITED STATES PATENT AND TRADEMARK OFFICE
CERTIFICATE OF CORRECTION

PATENT NO. : 3,925,695
DATED : December 9, 1975
INVENTOR(S) : Virgil W. Raby

It is certified that error appears in the above-identified patent and that said Letters Patent are hereby corrected as shown below:

Col. 3, line 52, after "bearing" insert -- support --.
Col. 4, line 54, after "sides" insert -- of the plates --.
Col. 8, line 28, after "formed" insert -- on --.
Col. 10, line 9, after "rotor" insert -- winding --.

Signed and Sealed this thirtieth Day of March 1976

[SEAL]

Attest:

RUTH C. MASON
*Attesting Officer*

C. MARSHALL DANN
*Commissioner of Patents and Trademarks*